United States Patent Office.

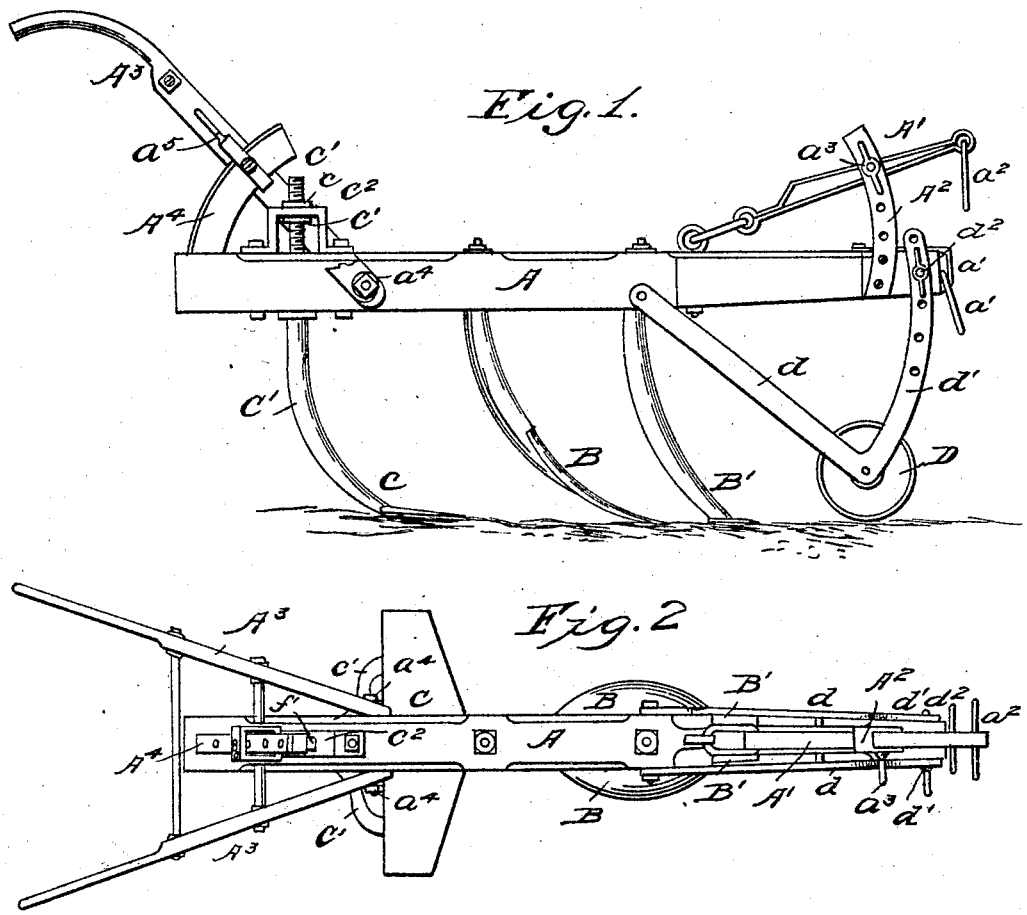

HENRY B. ARNOLDT AND JOHN GRIMM, OF ST. LOUIS, MISSOURI.

Letters Patent No. 74,031, dated February 4, 1868.

IMPROVEMENT IN CULTIVATORS.

The Schedule referred to in these Letters Patent and making part of the same.

TO ALL WHOM IT MAY CONCERN:

Be it known that we, HENRY B. ARNOLDT and JOHN GRIMM, of the county of St. Louis, and State of Missouri, have made certain new and useful Improvements in Cultivators; and we do hereby declare that the following is a full and clear description thereof, reference being had to the accompanying drawings, and to the letters of reference marked thereon.

The object of this invention is to produce a cultivator that will not only cultivate and loosen the soil to any required depth, but also, at the same time, cut off the weeds between the rows of plants that are cultivated by it, and thus effectually stop their further growth. The devices employed are the usual cultivator-teeth, and a knife, scraper, or cutter for destroying the weeds, the whole attached to and combined with a plough-beam and handles, in the usual manner of cultivators; and, in addition to the improvements above alluded to, there are others for the purpose of adapting the plough-handles to the size of the person operating the cultivator, and still others for the purpose of regulating the depth to which the cultivator and scraper or cutter is to run in the ground.

To enable those skilled in the art to make and use our improved cultivator, we will proceed to describe its construction and operation.

Figure 1, of the drawings, is a side elevation of one of the improved cultivators, with one of the handles removed.

Figure 2 is a plan of the cultivator.

The beam A will be of wood, as usual, and a shovel-plough, B, or some other suitable cultivating-instrument, will be affixed to the forward part of it. A coulter or cutter, B', will immediately precede the plough B, and open the ground. Directly behind the plough B, and, like it, attached to the beam A, is the weed-cutter C, which is a horizontal blade, sharpened at its forward edge, the central part of which should be farther advanced than the flanks, thus forming the front edge of the said blade somewhat in the shape of the letter V, with its apex in the centre, and farthest advanced, thus enabling the blade to strike a glancing cut on the weeds, and thereby cut them off at a stroke. The shank $C^1$ of the weed-cutter extends up through the beam, and also through a metal staple, $C^2$, affixed to its top side. The screw-nuts $c$ $c'$ are screwed on to the threads cut in the upper end of the shank $C^1$, one of them above the staple $C^2$, and the other one below it. By means of these two screw-nuts, the weed-cutter may be set higher or lower, as may be desired, and thus the depth of cut regulated.

The front end of the beam A is provided with the usual ring, $a$, and clevis, $a^1$, which may be so adjusted as to regulate the line of draught, in such a manner as to make the plough run more or less deep, as may be desired. In case, however, this device for regulating the depth may not prove sufficient for deep ploughing, a movable arm, $A^1$, is attached to the upper side of the beam, near its front end, and is provided with a draught-ring, $a^2$, to which the team may be attached. The arm $A^1$ may be elevated or depressed, as may be desired, and secured in position by means of the adjusting-pin $a^3$ and the graduated rack $A^2$.

A roller, D, having its bearings in the inclined arms $d$ and the graduated rack $d^1$, may be moved up or down, and secured in any desired position, by means of the pin $d^2$, which passes through the said rack $d^1$, and also through the beam A, and holds the parts in the position desired. The roller D, when once fixed in its proper position, is intended to roll along over the surface of the ground, and so regulate the depth of the plough and weed-cutter.

The plough-handles $A^3$ are to be fixed to the sides of the beam A by means of the pivot-pin $a^4$, so that their back ends may be elevated or depressed, to accommodate a short or a tall person. The curved rack $A^4$ and set-screw $a^5$ will serve to secure the back ends of the handles at their proper elevations.

Having described our invention, what we claim, is—

1. The weed-cutter C, when combined with a cultivator, A B, as and for the purpose herein shown and described.

2. We claim the movable arm $A^1$, when combined with the plough-beam A, as described, and for the purpose set forth.

3. We claim the plough-handles $A^3$ and the curved rack $A^4$, for the purposes herein set forth and described.

In testimony of which invention, we hereunto set our hands, this 1st day of July, A. D. 1867, in presence of—

H. B. ARNOLDT,
JOHN GRIMM.

Witnesses:
M. RANDOLPH,
S. M. RANDOLPH.